(12) United States Patent
Kong et al.

(10) Patent No.: US 12,211,984 B2
(45) Date of Patent: Jan. 28, 2025

(54) THERMAL DEVICE FOR HEATING AND COOLING BATTERY MODULES

(71) Applicant: GM GLOBAL TECHNOLOGY OPERATIONS LLC, Detroit, MI (US)

(72) Inventors: Dewen Kong, Shanghai (CN); Dave G. Rich, Sterling Heights, MI (US); Lyall K. Winger, Waterloo (CA); Meiyuan Wu, Shanghai (CN); Jingyuan Liu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 946 days.

(21) Appl. No.: 17/203,863

(22) Filed: Mar. 17, 2021

(65) Prior Publication Data

US 2022/0021044 A1    Jan. 20, 2022

(30) Foreign Application Priority Data

Jul. 16, 2020   (CN) .................. 202010686358.X

(51) Int. Cl.
  *H01M 10/63*  (2014.01)
  *H01M 10/615*  (2014.01)
  *H01M 10/625*  (2014.01)
  *H02J 7/00*  (2006.01)

(52) U.S. Cl.
  CPC ......... *H01M 10/63* (2015.04); *H01M 10/615* (2015.04); *H01M 10/625* (2015.04); *H02J 7/0013* (2013.01); *H02J 7/0063* (2013.01); *H01M 2220/20* (2013.01)

(58) Field of Classification Search
  CPC ........... H01M 10/60–667; H02J 7/0013; H02J 7/0063
  See application file for complete search history.

(56) References Cited

U.S. PATENT DOCUMENTS

| | | | |
|---|---|---|---|
| 6,909,201 B2 | 6/2005 | Murty et al. | |
| 9,184,582 B2 | 11/2015 | Koch et al. | |
| 9,440,600 B2 | 9/2016 | Koch et al. | |
| 9,911,249 B2 | 3/2018 | Koch et al. | |
| 10,395,442 B2 | 8/2019 | Conell et al. | |
| 2013/0236753 A1* | 9/2013 | Yue ...................... | B82Y 30/00 165/185 |
| 2019/0393569 A1 | 12/2019 | Rich et al. | |

(Continued)

FOREIGN PATENT DOCUMENTS

CN     210956923 U  *  7/2020

OTHER PUBLICATIONS

Pan et al. CN210956923U. Jul. 7, 2020. English machine translation by EPO. (Year: 2020).*

(Continued)

*Primary Examiner* — James Lee

(57) ABSTRACT

A thermal device comprises a first layer of a non-metallic material that is a good conductor of heat and electricity, that includes a first terminal and a second terminal, and that has a first surface and a second surface; a metallic material disposed on the first surface of the first layer; a first plastic layer disposed on the metallic material; and a second plastic layer disposed on the second surface of the first layer. The first plastic layer and the second plastic layer include a plastic material that is a good conductor of heat.

21 Claims, 14 Drawing Sheets

(56) References Cited

U.S. PATENT DOCUMENTS

2020/0018796 A1    1/2020    Conell et al.
2020/0044437 A1    2/2020    Conell et al.

OTHER PUBLICATIONS

U.S. Appl. No. 16/183,803, filed Nov. 8, 2018, Winger et al.
U.S. Appl. No. 16/183,895, filed Nov. 8, 2018, Rich et al.
U.S. Appl. No. 16/184,126, filed Nov. 8, 2018, Winger et al.
U.S. Appl. No. 16/275,809, filed Feb. 14, 2019, Winger et al.
U.S. Appl. No. 16/290,457, filed Mar. 1, 2019, Winger et al.
U.S. Appl. No. 16/487,914, filed Aug. 22, 2019, Yu et al.

* cited by examiner

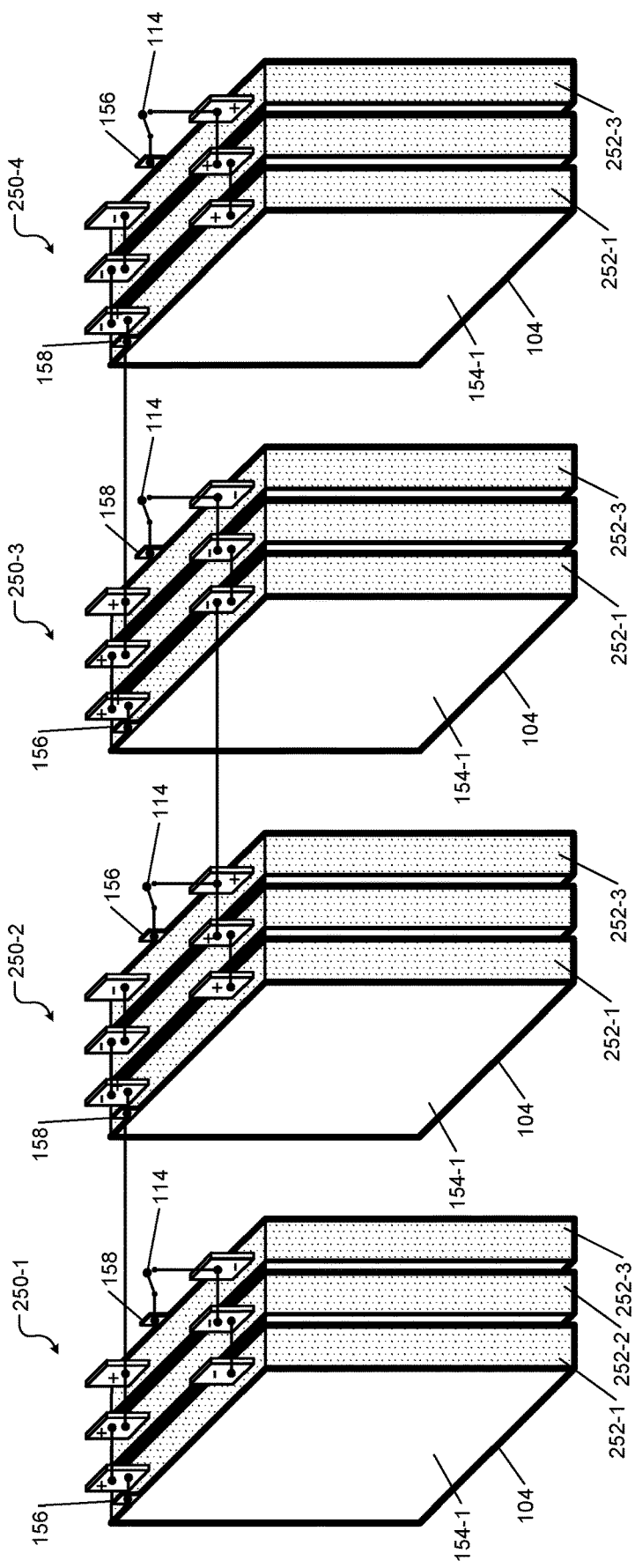
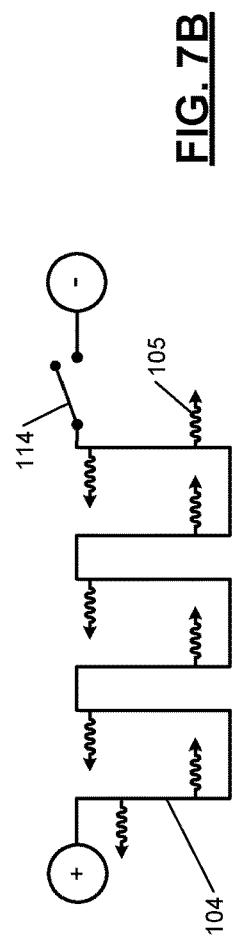
FIG. 7A
FIG. 7B

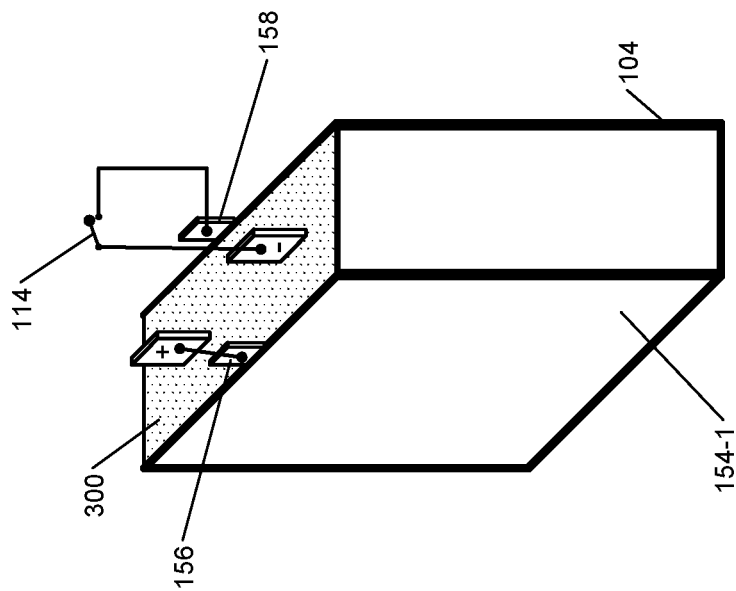
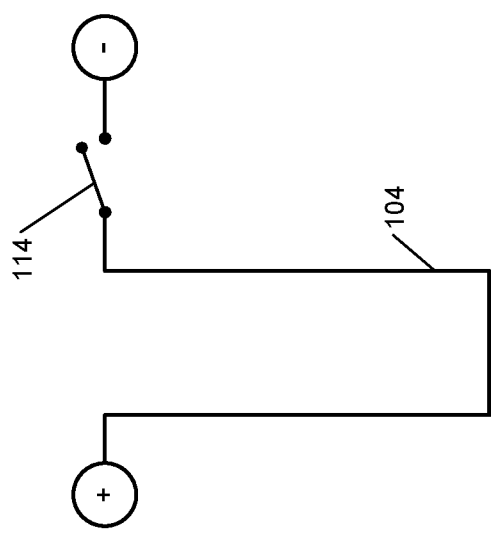
FIG. 8A
FIG. 8B

THERMAL DEVICE FOR HEATING AND COOLING BATTERY MODULES

CROSS-REFERENCE TO RELATED APPLICATIONS

This application claims the benefit of Chinese Patent Application No. 202010686358.X, filed on Jul. 16, 2020. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to battery modules and more particularly to a thermal device for heating and cooling battery modules.

Battery modules comprising multiple cells (i.e., batteries) are used in a variety of applications including hybrid and electric vehicles. The battery modules can overheat during operation. Conversely, the battery modules can be cold at cold start or during start-stop operations. In both conditions, the battery modules may not operate properly.

SUMMARY

A thermal device comprises a first layer of a non-metallic material that is a good conductor of heat and electricity, that includes a first terminal and a second terminal, and that has a first surface and a second surface; a metallic material disposed on the first surface of the first layer; a first plastic layer disposed on the metallic material; and a second plastic layer disposed on the second surface of the first layer. The first plastic layer and the second plastic layer include a plastic material that is a good conductor of heat.

In another feature, the non-metallic material includes graphite, graphene, carbon nanotubes, pressed graphite or carbon powder, a polymer, or a phase change material.

In another feature, the metallic material, the first terminal, and the second terminal include copper, aluminum, nickel, nickel coating with copper, stainless steel, or an aluminum alloy.

In another feature, the plastic material includes polyphenylene sulfide, polybutylene terephthalate, liquid-crystal polymer, polycarbonate, or polyamide.

In another feature, the plastic material of the first plastic layer is different than the plastic material of the second plastic layer.

In another feature, thicknesses of the first plastic layer and the second plastic layer are different.

In other features, a system comprises the thermal device and a battery including N cells, where N is a positive integer. The thermal device is disposed around at least one of the N cells. The first terminal is connected to one of a positive terminal and a negative terminal of the battery. The second terminal is connected to the other one of the positive terminal and the negative terminal of the battery via a switch.

In another feature, the first layer of the thermal device conducts heat from the at least one of the N cells.

In another feature, the system further comprises a startup circuit configured to receive a signal to connect the battery to a load and to close the switch in response to receiving the signal.

In another feature, current flows through the first layer and heats the first layer and the metallic material, and the metallic material generates infrared radiation that heats the at least one of the N cells.

In another feature, the system further comprises a temperature sensor configured to sense a temperature of the at least one of the N cells. The startup circuit is configured to close the switch in response to the temperature being less than a threshold temperature and open the switch in response to the temperature being greater than or equal to the threshold temperature.

In other features, a system comprises M of the thermal device of claim 1, where M is a positive integer; and M batteries connected to each other, each of the M batteries including N cells, where N is a positive integer. The M thermal devices are disposed around at least one of the N cells of the M batteries, respectively; around the M batteries, respectively, without being disposed around the N cells of the M batteries; or both. The first terminal of the M thermal devices is connected to one of a positive terminal and a negative terminal of the M batteries, respectively. The second terminal of the M thermal devices is connected to the other one of the positive terminal and the negative terminal of the M batteries, respectively, via a respective switch.

In another feature, the first layer of the M thermal devices conducts heat from the at least one of the N cells of the M batteries, respectively; or from the M batteries, respectively.

In another feature, the system further comprises a startup circuit configured to receive a signal to connect a load to the M batteries and to close the switch for at least one of the M thermal devices in response to receiving the signal.

In another feature, current flows through the first layer and heats the first layer and the metallic material of the at least one of the M thermal devices, and the metallic material of at least one of the M thermal devices generates infrared radiation that heats the at least one of the N cells of the M batteries or at least one of the M batteries, respectively.

In another feature, the system further comprises a temperature sensor configured to sense a temperature of the at least one of the N cells of at least one of the M batteries. The startup circuit is configured to close the switch for at least one of the M thermal devices in response to the temperature being less than a threshold temperature and open the switch for at least one of the M thermal devices in response to the temperature being greater than or equal to the threshold temperature.

In other features, the thermal device further comprises a second layer of a non-metallic material that is a good conductor of heat and electricity, that includes a third terminal and a fourth terminal, and that has a third surface and a fourth surface; a second metallic material disposed on the third surface of the second layer; the first plastic layer disposed on the second metallic material; and the second plastic layer disposed on the fourth surface of the second layer.

In other features, at least one of thicknesses of the first layer and the second layer are different, and thicknesses of the metallic material and the second metallic material are different.

In other features, a system comprises the thermal device and a battery including N cells, where N is a positive integer. The thermal device is disposed around at least one of the N cells. The first terminal and the third terminal are connected to one of a positive terminal and a negative terminal of the battery. The second terminal and the fourth terminal are connected to the other one of the positive terminal and the negative terminal of the battery via a first switch and a second switch, respectively.

In other features, the first layer and the second layer conduct heat from the at least one of the N cells. The system further comprises a startup circuit configured to receive a signal to connect the battery to a load and to close at least one of the first switch and the second switch in response to receiving the signal. Current flows through at least one of the first layer and the second layer and heats at least one of the first layer and the second layer and at least one of the metallic material and the second metallic material. At least one of the metallic material and the second metallic material generates infrared radiation that heats the at least one of the N cells.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7A and 7B show a cascaded arrangement of battery modules with the thermal device of FIG. 2A disposed around the cells of the battery modules according to the present disclosure;

FIGS. 8A-8D show examples of a bipolar cell with the thermal devices of FIGS. 2A and 2B disposed around the bipolar cell according to the present disclosure;

In the drawings, reference numbers may be reused to identify similar and/or identical elements.

DETAILED DESCRIPTION

Figure 1A:
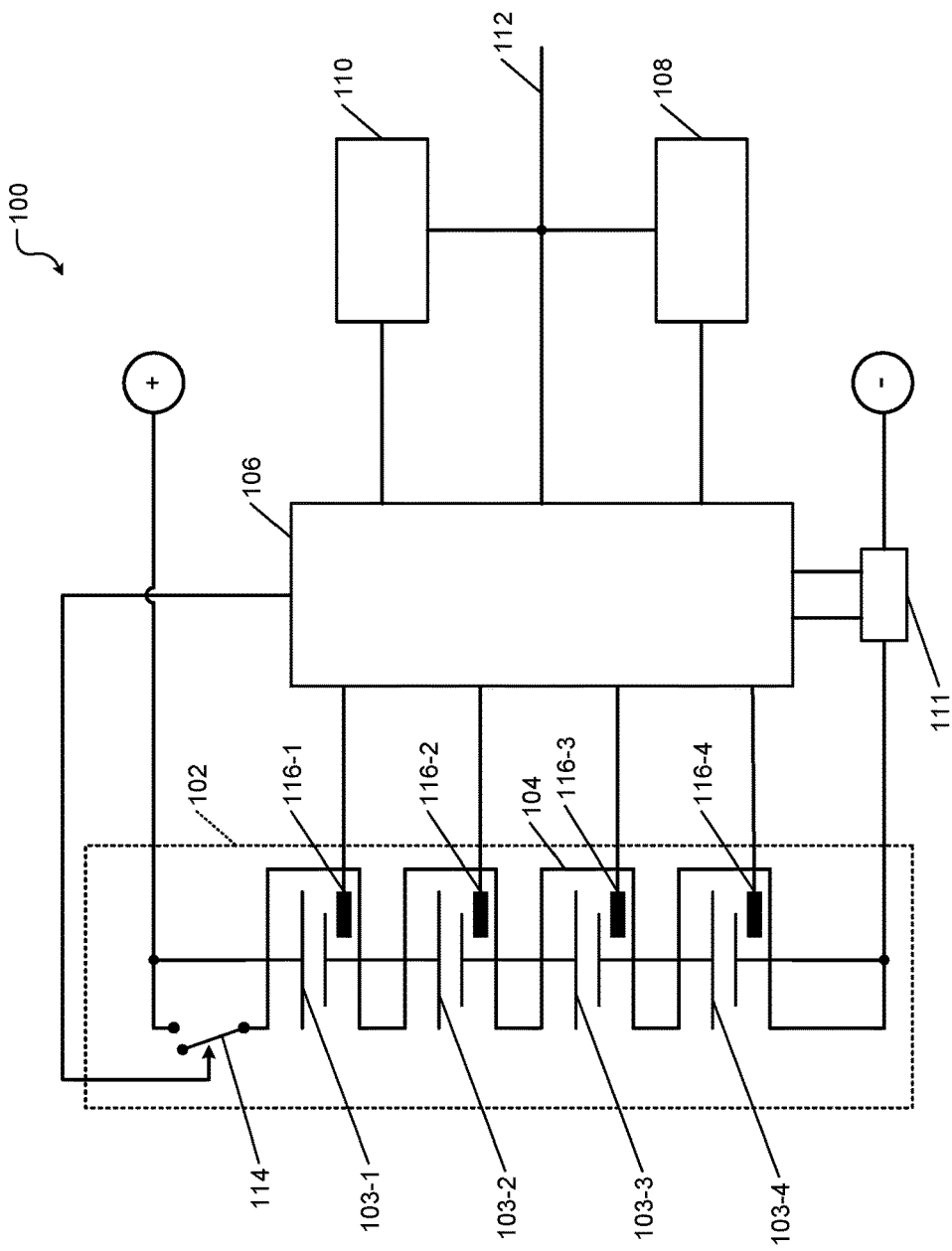
FIG. 1A shows an example of a system comprising a battery module and a thermal device according to the present disclosure.

The present disclosure provides a thermal device to heat battery modules at cold start and during start/stop operations and to prevent the battery modules from overheating during operation. The thermal device comprises a first layer of a non-metallic material that is a good conductor of heat and electricity, a pair of metal wires disposed on the first layer, and two layers of a plastic material that is a good conductor of heat enclosing the first layer and the metal wires. The metal wires and the first layer are sandwiched between the two layers of the plastic material. The plastic layers comprising the metal wires and the first layer are disposed around one or more cells of a battery module and/or around one or more battery modules.

To heat the battery module at cold start and during start/stop operations, the first layer is connected to the battery module through a switch. When the switch is closed (turned on), the battery module supplies power to the first layer. The first layer heats due to Joule heating, which heats the metal wires and causes the metal wires to generate infrared radiation. The plastic layers conduct the Joule heat and heat from the infrared radiation to heat the cells of the battery module. The switch is opened (turned off) when temperature of the battery module reaches a threshold.

Conversely, when the battery module becomes hot during operation, heat from hot spots in the cells of the battery module is distributed across the first layer, which prevents formation of the hot spots. The thermal device can be implemented in low-voltage battery modules to allow use of a wide range of cells (e.g., low-cost LFP cells, solid-state batteries, etc.) for high power battery modules. These and other features of the thermal device of the present disclosure are described below in detail. Throughout the present disclosure, while a vehicle is used as an example for illustrative purposes, the teachings of the present disclosure are also applicable to non-vehicle implementations.

The present disclosure is organized as follows. Examples of a thermal device and of a system that uses the thermal device are shown and described with reference to FIGS. 1A and 1B. Examples of a thermal device are shown and described with reference to FIGS. 2A and 2B. Examples of a battery module and a thermal device disposed around cells of the battery module are shown and described with reference to FIGS. 3A and 3B. The heating and heat distribution performed by the thermal device is shown and described with reference to FIGS. 4A-4C. Additional examples of a battery module and a thermal device disposed around cells of the battery module are shown and described with reference to FIGS. 5A-6C.

Examples of a plurality of interconnected battery modules and a thermal device disposed around cells of the battery modules are shown and described with reference to FIGS. 7A and 7B. Examples of a bipolar cell and a thermal device disposed around the bipolar cell are shown and described with reference to FIGS. 8A-8D. Additional examples of the bipolar cell and a thermal device disposed around the bipolar cells are shown and described with reference to FIGS. 9A-9C. Examples of a dual thermal device are shown and described with reference to FIGS. 10A and 10B. Examples of battery modules and the dual thermal device disposed around cells of the battery modules are shown and described with reference to FIGS. 11A and 11B.

FIG. 1A shows a system 100 comprising a thermal device according to the present disclosure. The system 100 comprises a battery module 102, a thermal device 104, a battery management module (BMM) 106, a startup module 108, and a communication module 110. A shunt 111 is connected in series with the battery module 102 and is connected to the BMM 106 to measure current supplied by the battery module 102. The BMM 106, the startup module 108, and the communication module 110 are connected to and communicate via a controller area network (CAN) bus 112 in a vehicle (now shown). Additional control modules that control other subsystems of the vehicle (e.g., an engine control module, a motor control module, a transmission control module, an infotainment subsystem control module, and so on; all not shown) may be connected to the CAN bus 112.

For example only, the battery module 102 is shown to include only four cells 103-1, 103-2, 103-3, and 103-4 (collectively cells 103) connected in series. Alternatively, the battery module 102 can include any number of cells. For example, the battery module 102 can include N cells, where N is a positive integer. Further, the cells in the battery module 102 can be interconnected in various series/parallel configurations (e.g., see FIG. 3A onwards). The positive and negative terminals of the battery module 102 are connected to a load (e.g., a motor of an electric vehicle, not shown) to be powered by the battery module 102.

The battery module 102 may include one or more temperature sensors located proximate to one or more cells 103 of the battery module 102. For example only, four temperature sensors 116-1, 116-2, 116-3, and 116-4 (collectively temperature sensors 116) are shown. Alternatively, the battery module 102 may include N temperature sensors, where N is a positive integer. The temperature sensors 116 sense temperature of one or more cells 103 of the battery module 102. Any of the battery module modules shown and described below with reference to FIG. 3A onwards can be used (along with one or more of the temperature sensors 116) in place of the battery module 102 in the system 100.

Figure 1B:
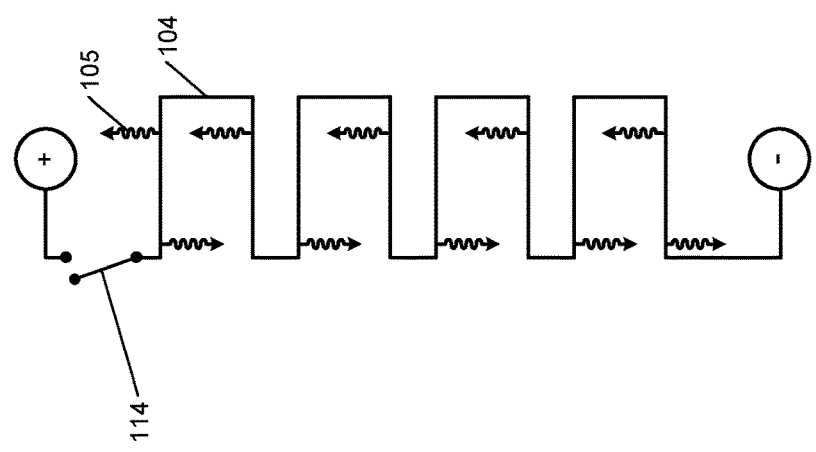
FIG. 1B shows an example of a thermal device according to the present disclosure.

FIG. 1B shows a schematic of an example of the thermal device 104. The thermal device 104 is described below in detail with reference to FIGS. 2A and 2B. The thermal device 104 is disposed around the cells 103 of the battery module 102. The thermal device 104 includes two terminals that are connected across the first layer in the thermal device 104 (see elements 156 and 158 in FIGS. 2A and 2B). A first terminal of the thermal device 104 is directly connected to a first terminal of the battery module 102. A second terminal of the thermal device 104 is connected to a second terminal of the battery module 102 via a switch 114. Alternatively, while not shown, the first terminal of the thermal device 104 can be connected to the first terminal of the battery module 102 via the switch 114, and the second terminal of the thermal device 104 can be directly connected to a second terminal of the battery module 102. For example, the switch 114 may include a relay, a field effect transistor, or any other switching device.

During cold start, the startup module 108 closes (turns on) the switch 114 and connects the thermal device 104 to the battery module 102. Alternatively, the communication module 110 can receive a signal from a remote device (e.g., a key fob equipped with a remote starter, not shown), and in response to receiving the signal from the remote device, the communication module 110 can close the switch 114 and connect the thermal device 104 to the battery module 102. The startup module 108 and the communication module 110 may communicate with the thermal device 104 and/or the switch 114 directly, via the BMM 106, or via another controller.

When the switch 114 is closed, the battery module 102 supplies power to the thermal device 104. Specifically, the battery module 102 supplies power to the first layer in the thermal device 104. The first layer in the thermal device 104 heats due to the power received from the battery module 102 (i.e., due to the current flowing through the first layer upon receiving the power from the battery module 102). Due to the heat generated by the first layer, the metal wires in the thermal device 104 (see FIGS. 2A and 2B) become hot and generate infrared radiation 105. The infrared radiation 105 heats the cells of the battery module 102. The temperature sensors 116 sense the temperature of the cells 103 of the battery module 102 and communicate the temperature to the BMM 106. When the temperature of the cells 103 or the battery module 102 reaches a threshold, the BMM 106 opens (turns off) the switch 114 and disconnects the thermal device 104 from the battery module 102.

A similar procedure is performed when the vehicle operates in a start/stop mode. In the start/stop mode, the power supply from the battery module 102 to the load (e.g., a motor in the vehicle) is shut off when the vehicle stops (e.g., at a traffic light or in a congested traffic) and is resupplied when the vehicle operator decides to move the vehicle. The temperature of the battery module 102 may drop below the threshold when the vehicle is temporarily stopped in the start/stop mode. The startup module 108 connects the thermal device 104 to the battery module 102 when the temperature of the battery module 102 drops below the threshold in the start/stop mode and disconnects the thermal device 104 from the battery module 102 when the temperature of the battery module 102 reaches the threshold.

During operation, the temperature of the battery module 102 increases. The first layer in the thermal device 104 conducts heat from one or more hot spots of the battery module 102. The heat from the hot spots is distributed across the first layer in the thermal device 104. Thus, the thermal device 104 prevents formation of hot spots in the battery module 102.

Figure 2A:
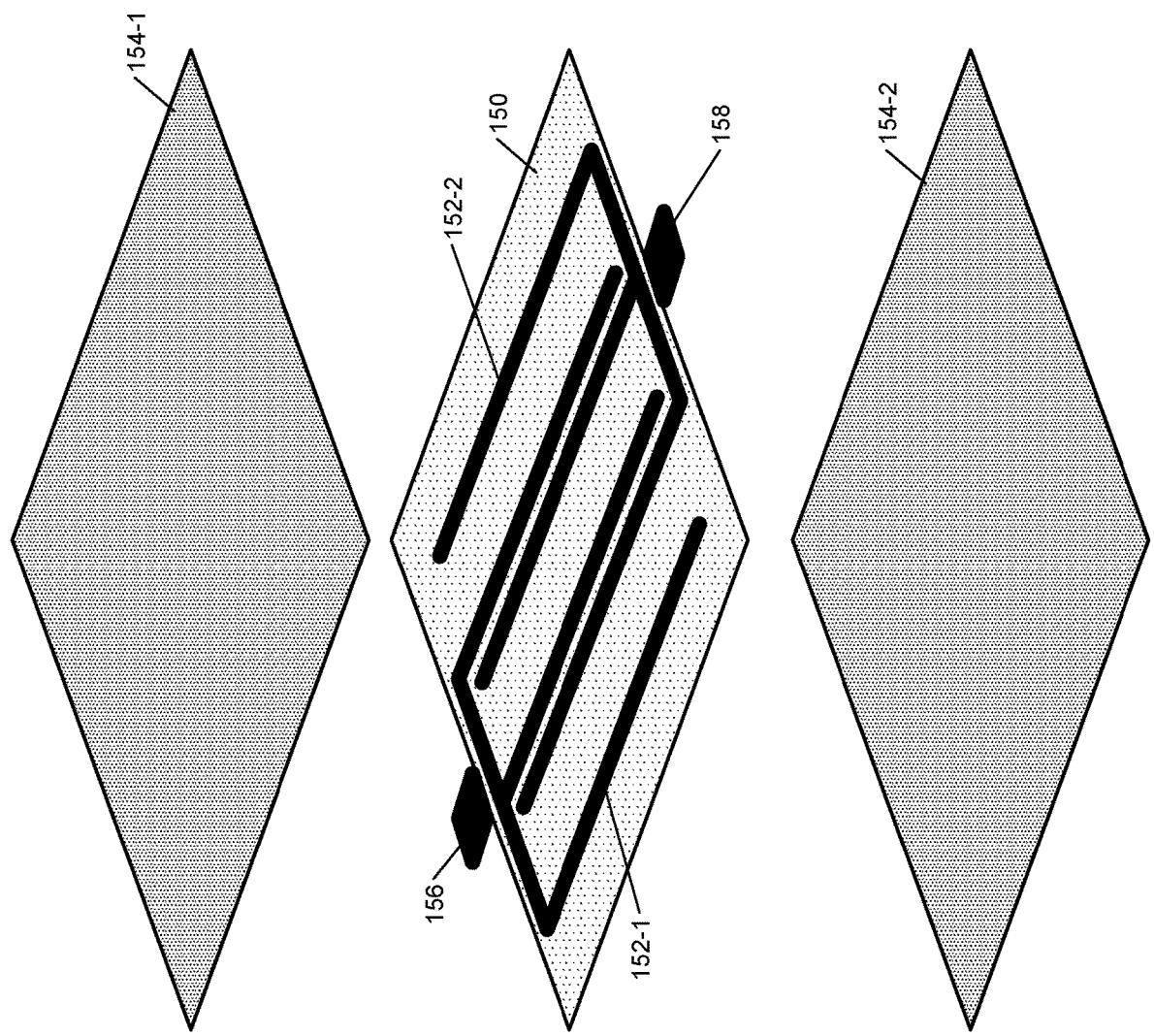
FIG. 2A shows an example of a thermal device according to the present disclosure.

FIG. 2A shows a first example of the thermal device 104. For example, the thermal device 104 comprises a first layer 150 of a material that is non-metallic and that is a good conductor of heat and electricity, a pair of metal wires 152-1 and 152-2 (collectively metal wires 152) disposed on the first layer 150, and two layers of a thermally conductive plastic material 154-1 and 154-2 (collectively plastic layers 154) enclosing the first layer 150 and the metal wires 152. The first layer 150 includes two terminals (or tabs) 156 and 158 to receive power. For example, the terminals 156 and 158 of the first layer 150 can be respectively connected to the positive and negative terminals (or to the negative and positive terminals) of a cell or a battery module (e.g., the battery module 102). The plastic layers 154 are good conductors of heat. As used herein, the phrase good conductor of heat used with reference to the first layer 150 and the plastic layers 154 indicates that the thermal conductivity of these layers is suitable to transfer a desirable amount of heat from these layers to cells and/or battery modules and that the thermal conductivity of these layers is synchronous with mechanical properties of these layers.

Figure 2B:
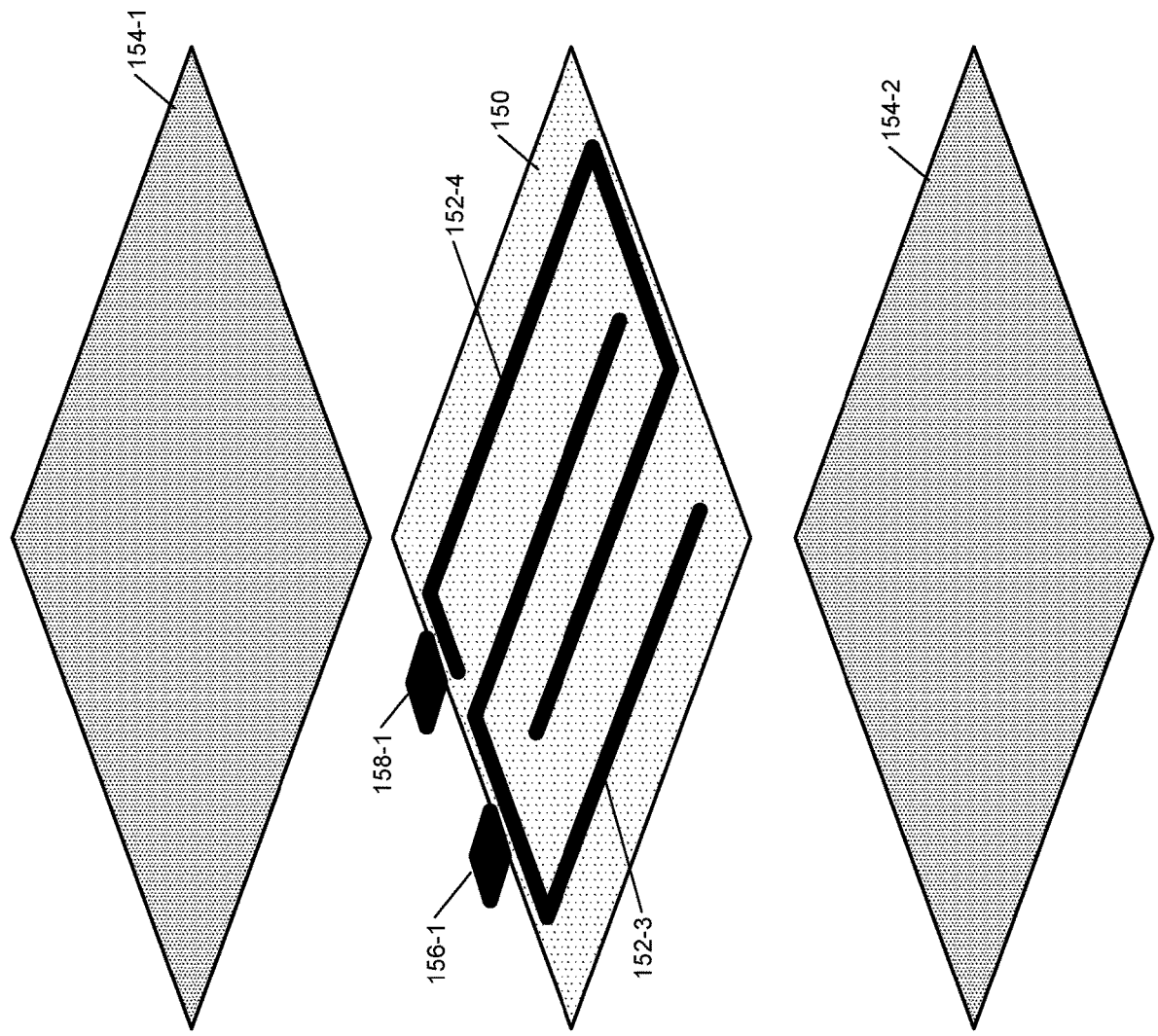
FIG. 2B shows another example of a thermal device according to the present disclosure.

FIG. 2B shows a second example of the thermal device 104, which is shown as element 104-1. The only difference between the thermal device 104 shown in FIG. 2A and the thermal device 104-1 shown in FIG. 2B is that the layout of metal wires 152-3, 152-4 in the thermal device 104-1 differs from the layout of the metal wires 152-1, 152-2 and that terminals 156-1, 158-1 in the thermal device 104-1 are on the same side of the first layer 150 instead of being on the opposite sides as shown in FIG. 2A.

Throughout the present disclosure, except where specifically identified, generally, the thermal devices 104 and 104-1 are collectively called the thermal device 104; the metal wires 152-1, 152-2, 152-3, and 152-4 are collectively called the metal wires 152; the terminals 156 and 156-1 are called the first terminal 156 of the thermal device 104; and the terminals 158 and 158-1 are called the second terminal 158 of the thermal device 104.

The following description applies to both FIG. 2A and FIG. 2B. While a pair of metal wires 152 is shown, any number of metal wires can be used. For example, N metal wires can be used, where N is a positive integer. Further, the layout of the metal wires 152 shown is for example only, and any other layout may be used instead. The layout of the metal wires 152 can have any shape so long as the metal wires 152 are spread and distributed across the first layer 150. Further, while shown as wires, the metal wires 152 need not be continues. That is, the metal wires 152 can include multiple discontinuous segments. Furthermore, the metal wires 152 can include a mesh of a metallic material. For example, the mesh can be in the form of a grid, or the mesh can have an irregular shape. In any of these forms, the metal wires 152 generate infrared radiation when heated.

For example, the first layer 150 may be made of a material such as graphite, graphene, carbon nanotubes, pressed graphite or carbon powder, a polymer that is a good conductor of heat and electricity, a phase change material, and so on. Due to the composition and properties of the material, the first layer 150 comprises a complex resistive network or array of randomly arranged resistive elements. Consequently, the first layer 150 heats due to Joule heating when power is applied from the battery module 102 across the first layer 150 and current flows through these resistive elements. Additionally, these resistive elements provide a uniform thermal path. Consequently, the first layer 150 provides passive or resistive cooling, draws heat from the cells of the battery module 102, and distributes the heat throughout the first layer 150, which reduces or eliminates hotspots in the cells of the battery module 102. The phase change material can act as a heat capacitor. That is, the phase change material can store the heat generated while current flows through the first layer 150 and can supply the stored heat to cells and/or battery modules after the first layer 150 is disconnected from power.

The plastic layers 154 can be made of a thermally conductive plastic such as but not limited to polyphenylene sulfide (PPS), polybutylene terephthalate (PBT), liquid-crystal polymer (LCP), polycarbonate (PC), polyamide such as PA6, PA46, and so on. In some implementations, both plastic layers 154-1 and 154-2 can be made of the same material and can have the same thickness. Alternatively, the plastic layers 154-1 and 154-2 can be made of the same material and can have different thicknesses. In some implementations, the plastic layers 154-1 and 154-2 can be made of different materials and can have the same thickness. In some implementations, the plastic layers 154-1 and 154-2 can be made of different materials and can have different thicknesses. The metal wires 152 and the terminals 156, 158 can be made of any metallic material such as but not limited to copper, aluminum, nickel, nickel coated with copper, stainless steel, aluminum alloys, etc.

The first layer 150, the metal wires 152, and the plastic layers 154 can be homogenous or can comprise multiple layers. The thicknesses of the first layer 150, the metal wires 152, and the plastic layers 154 can be selected depending on the number of cells in the battery modules, the size and shape of the cells and the battery modules, the voltages of the cells and the battery modules, the types of cells in the battery modules, and so on. For example, the thickness of the first layer 150 may range from 1 micrometer to 10 millimeters.

The thermal device 104 can also reduce electromagnetic interference (EMI). For example, the first layer 150 can reflect EMI while the metal wires 152 can absorb EMI.

As shown and described with reference to FIG. 3A onwards, the thermal device 104 can be arranged between each cell in a battery module. Alternatively, the thermal device 104 can be arranged around the battery module without being arranged between the cells of the battery module. Further, when battery modules are connected in a cascaded arrangement (e.g., see FIG. 7A), the cells or battery modules in a center portion of the cascaded arrangement may take longer to heat. Accordingly, in the cascaded arrangement, the thermal device 104 may be arranged between each cell in battery modules located near the center portion of the cascaded arrangement and may be arranged around the battery modules located at the periphery of the cascaded arrangement without being arranged between the cells of the battery modules located at the periphery of the cascaded arrangement.

In some implementations, in the cascaded arrangement, the thermal device 104 may not be used with the battery modules at the periphery of the cascaded arrangement; rather, the thermal device 104 may be arranged only between each cell in the battery modules located near the center portion of the cascaded arrangement, or the thermal device 104 may be arranged only around the battery modules located near the center portion of the cascaded arrangement.

Figure 3B:
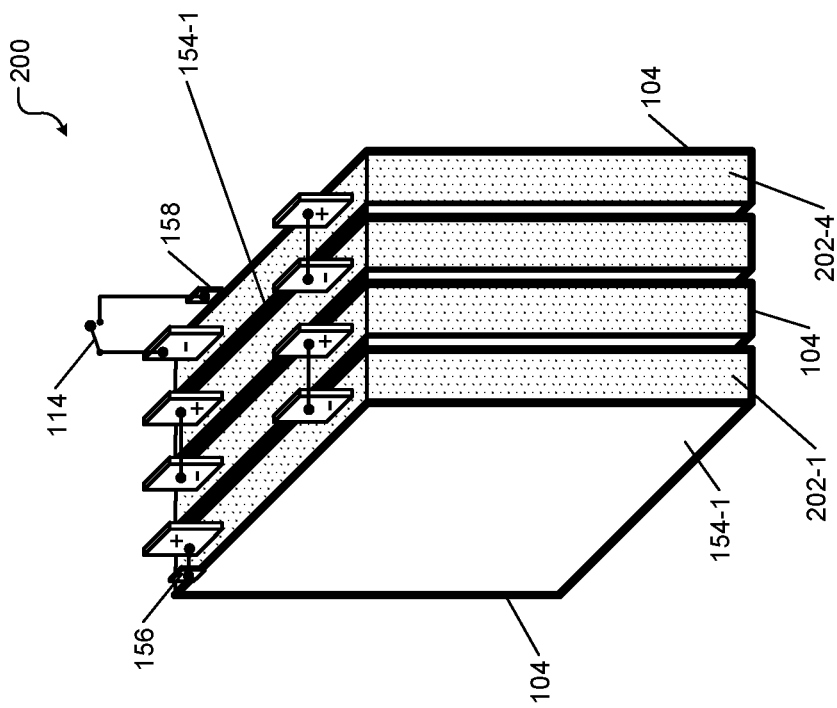
FIG. 3B shows an example of the battery module of FIG. 3A with the thermal device of FIG. 2A disposed around the cells of the battery module according to the present disclosure.
Figure 3A:
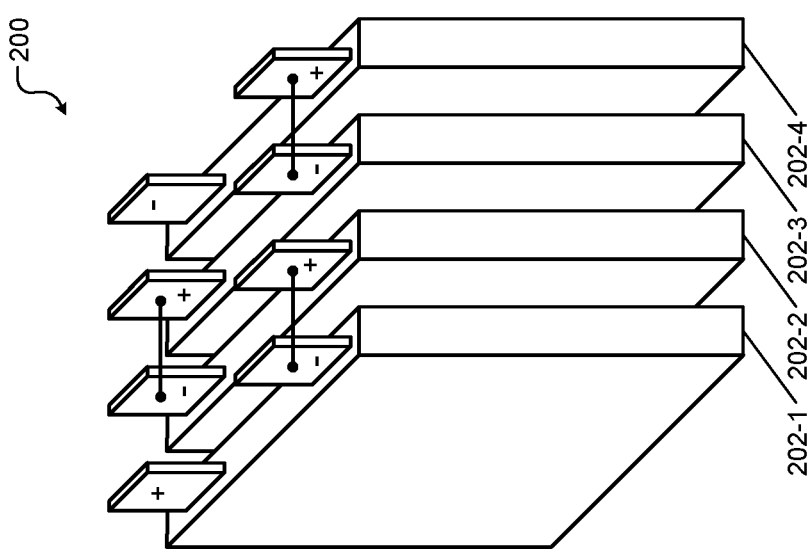
FIG. 3A shows an example of a battery module.

FIGS. 3A and 3B show examples of a battery module and a thermal device disposed around cells of the battery module. FIG. 3A shows an example of a lithium iron phosphate (LFP) battery module 200 comprising four cells connected in series to form a 12V battery module. The four cells are shown as 202-1, 202-2, 202-3, and 202-4 and are collectively called the cells 202. For example, each cell 202 in the battery module 200 may be a liquid electrolyte based lithium-ion battery (LIB). The voltage of each cell 202 may be less than or equal to 5V. For example, the battery module 200 can be used in the system 100 shown in FIG. 1A.

FIG. 3B shows an example of the thermal device 104 shown in FIG. 2A arranged between and around each cell 202 of the battery module 200 shown in FIG. 3A. In the perspective view shown, only the plastic layer 154-1 of the thermal device 104 is visible.

In the battery module 200, the first terminal 156 of the thermal device 104 is connected to a positive terminal of the first cell 202-1 of the battery module 200. A negative terminal of the first cell 202-1 is connected to a positive terminal of the second cell 202-2 of the battery module 200. A negative terminal of the second cell 202-2 is connected to a positive terminal of the third cell 202-3 of the battery module 200. A negative terminal of the third cell 202-3 is connected to a positive terminal of the fourth cell 202-4 of the battery module 200. A negative terminal of the fourth cell 202-4 is connected to the second terminal 158 of the thermal device 104 via the switch 114. The first and second terminals 156, 158 of the thermal device 104 are on opposite sides of the battery module 200. The thermal device 104 can be operated as described above with reference to FIGS. 1A and 1B.

Figure 4C:
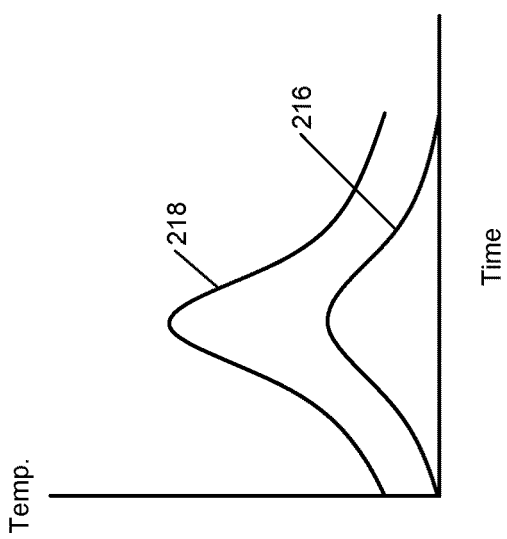
FIG. 4C shows heat distribution in one or more cells of the battery module with and without the thermal device of FIG. 3B according to the present disclosure.
Figure 4B:
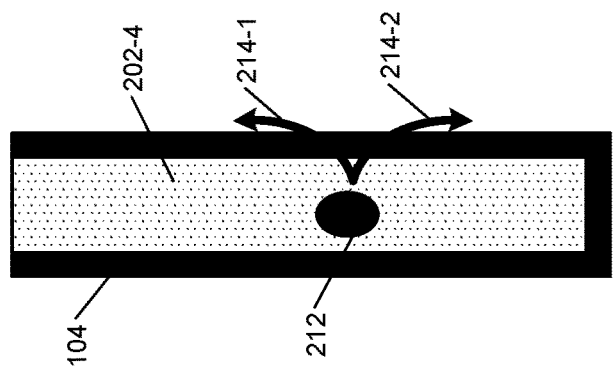
FIG. 4B shows an example of heat transfer from a cell of the battery module to the thermal device of FIG. 3B according to the present disclosure.
Figure 4A:
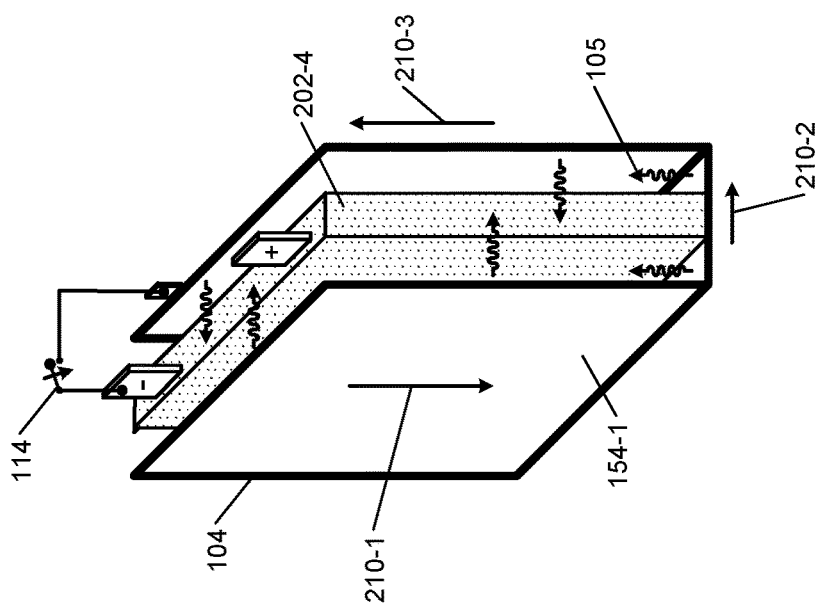
FIG. 4A shows an example of heat transfer from the thermal device to a cell of the battery module of FIG. 3B according to the present disclosure.

FIGS. 4A-4C show the heating and heat distribution performed by the thermal device 104 in the battery module 200 shown in FIGS. 3A and 3B. FIG. 4A shows an example of how the thermal device 104 heats the fourth cell 202-4 when the switch 114 is closed. While other cells 202 of the battery module 200 are not shown for simplicity of illustration, it is understood that the other cells 202 are similarly heated by the thermal device 104. Arrows 210-1, 210-2, and 210-3 show the direction of current flow through the first layer 150 of the thermal device 104, which heats the metal wires 152 in the thermal device 104, which in turn generates infrared radiation 105 that heats the cells 202 of the battery module 200.

FIG. 4B shows how the thermal device 104 draws and distributes heat from the cells 202 of the battery module 200. While only the fourth cell 202-4 is shown for simplicity of illustration, it is understood that the thermal device 104 similarly draws and distributes heat from the other cells 202 of the battery module 200. Element 212 shows an example of a hot spot 212 in the fourth cell 202-4, and arrows 214-1 and 214-2 show directions of heat flow and heat distribution from the hot spot 212 through the first layer 150 of the thermal device 104.

FIG. 4C shows a graph of temperature versus time for the cells 202 of the battery module 200. Graph 216 shows how the hot spot 212 is transformed into a warm spot when the thermal device 104 is used in the battery module 200. Graph 218 shows formation of the hot spot 212 in the cells 202 when the thermal device 104 is not used in the battery module 200.

Figure 5B:
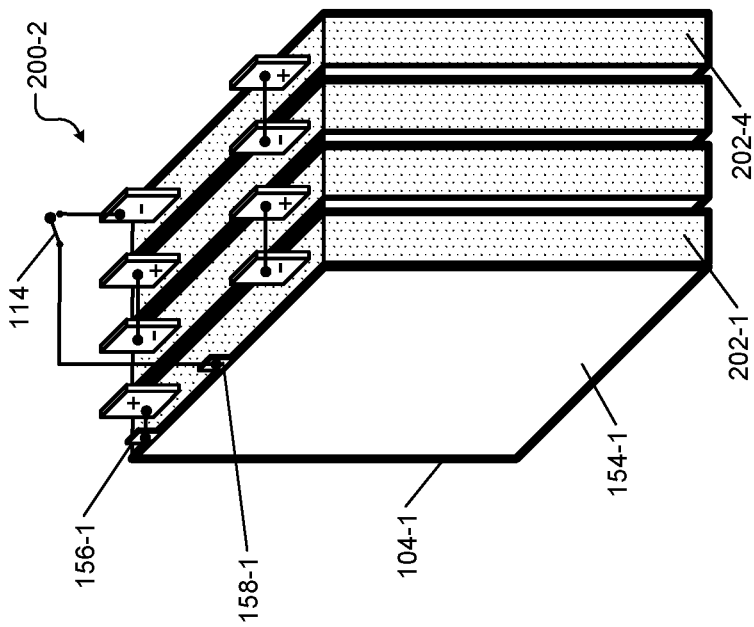
FIGS. 5A, 5B, 6A, 6B, and 6C show additional examples of battery modules with the thermal devices of FIGS. 2A and 2B disposed around cells of the battery modules according to the present disclosure.
Figure 5A:
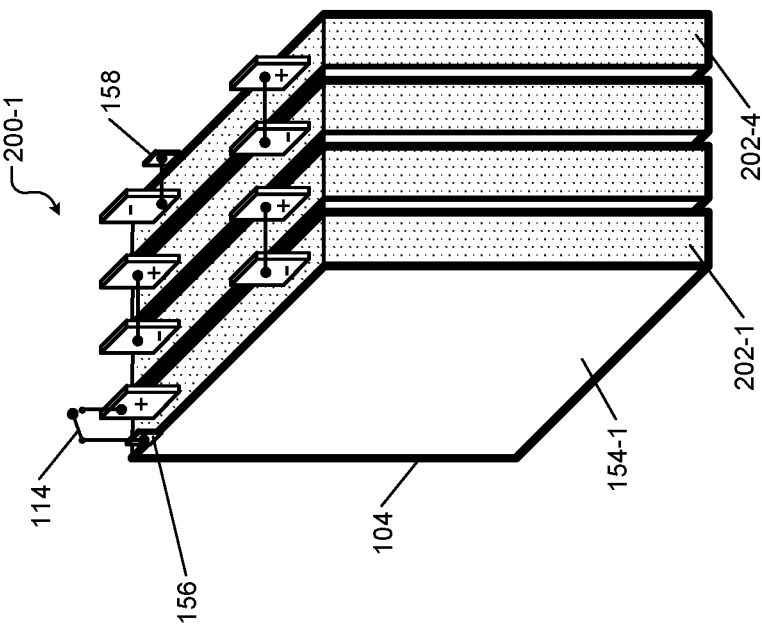

FIGS. 5A-6C show additional examples of arrangements 200-1 and 200-2 of the battery module 200 and the thermal device 104 disposed around the cells 202 of the battery module 200. The arrangement 200-1 of the battery module 200 and the thermal device 104 shown in FIG. 5A is the same as in FIG. 3B except that in FIG. 5A, the switch 114 is located between first terminal 156 of the thermal device 104 and the positive terminal of the first cell 202-1, and the negative terminal of the fourth cell 202-4 is directly connected to the second terminal 158 of the thermal device 104. The battery module 200 shown in the arrangement 200-1 can be used in the system 100 shown in FIG. 1A, and the thermal device 104 can be operated as described above with reference to FIGS. 1A and 1B.

FIG. 5B shows an arrangement 200-2 of the battery module 200 with the thermal device 104-1 shown in FIG. 2B. The arrangement 200-2 is the same as the arrangement shown in FIG. 3B except that in FIG. 5B, the first and second terminals 156-1, 158-1 of the thermal device 104-1 are located on the same side of the battery module 200; the first terminal 156-1 of the thermal device 104-1 is connected to the positive terminal of the first cell 202-1 of the battery module 200; and the second terminal 158-1 of the thermal device 104-1 is connected to the negative terminal of the fourth cell 202-4 via the switch 114.

While not shown, another arrangement is also possible where the first and second terminals 156-1, 158-1 of the thermal device 104-1 are located on the same side of the battery module 200; the first terminal 156-1 of the thermal device 104-1 is connected to the positive terminal of the first cell 202-1 of the battery module 200 via the switch 114; and the second terminal 158-1 of the thermal device 104-1 is directly connected to the negative terminal of the fourth cell 202-4 of the battery module 200. The battery module 200 shown in the arrangement 200-2 can be used in the system 100 shown in FIG. 1A, and the thermal device 104-1 can be operated similar to the thermal device 104 described above with reference to FIGS. 1A and 1B.

Figure 6C:
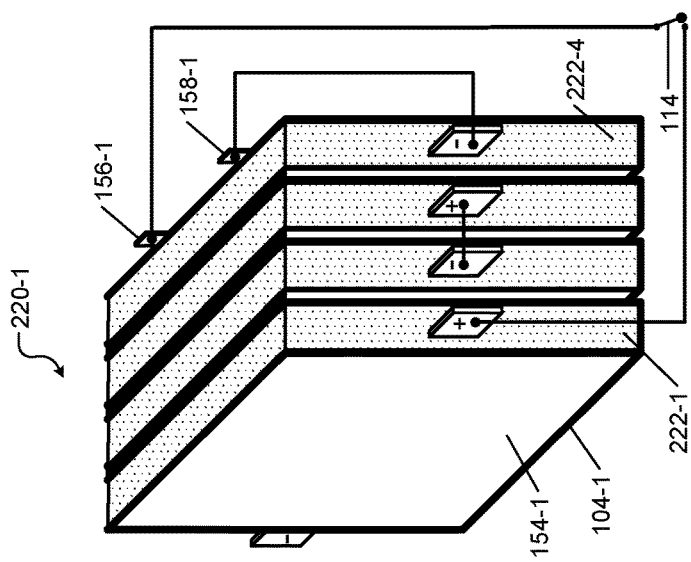
Figure 6B:
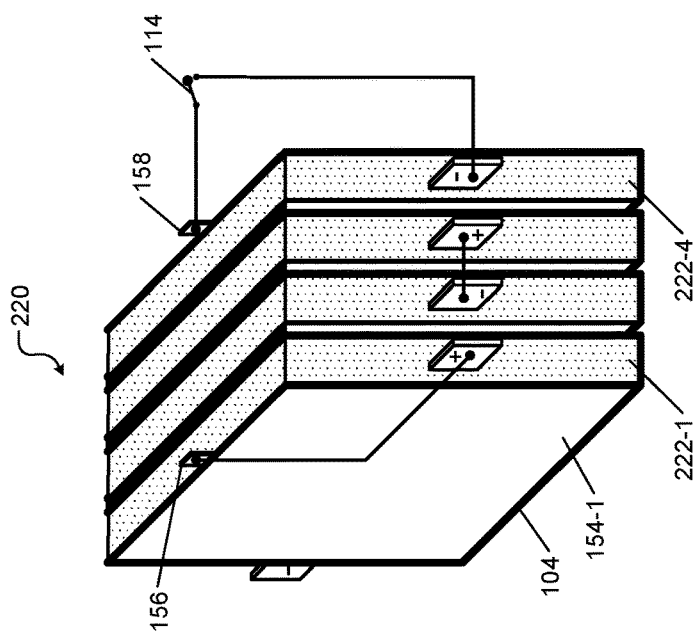
Figure 6A:
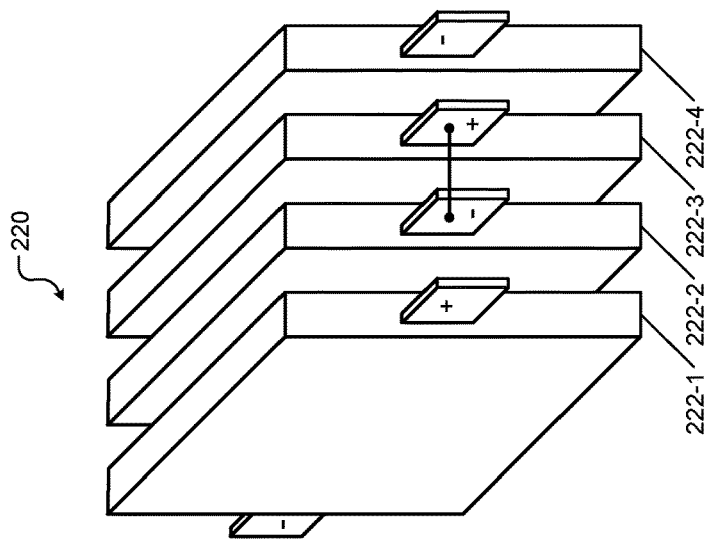

FIGS. 6A-6C show arrangements of a battery module 220 and the thermal devices 104, 104-1 shown in FIGS. 2A and 2B. These arrangements can be used in the system 100 shown in FIGS. 1A and 1B. FIG. 6A shows the battery module 220 including four cells 222-1, 222-2, 222-3, and 222-4 (collectively the cells 222). The cells 222 are similar to the cells 202 of the battery module 200 shown in FIGS. 3A-5B except that each cell 222 includes positive and negative terminals on opposite sides of the cell instead of on the same side of the cell.

FIG. 6B shows an example of the thermal device 104 shown in FIG. 2A arranged between and around each cell 222 of the battery module 220 shown in FIG. 6A. In the perspective view shown, only the plastic layer 154-1 of the thermal device 104 is visible.

In the battery module 220, the first terminal 156 of the thermal device 104 is connected to a positive terminal of the first cell 222-1 of the battery module 220. A negative terminal of the first cell 222-1 is connected to a positive terminal of the second cell 222-2 (not visible) of the battery module 220. A negative terminal of the second cell 222-2 is connected to a positive terminal of the third cell 222-3 of the battery module 220. A negative terminal of the third cell 222-3 (not visible) is connected to a positive terminal of the fourth cell 222-4 (not visible) of the battery module 220. A negative terminal of the fourth cell 222-4 is connected to the second terminal 158 of the thermal device 104 via the switch 114.

The first and second terminals 156, 158 of the thermal device 104 are on opposite sides of the battery module 220. The battery module 220 can be used in the system 100 shown in FIG. 1A, and the thermal device 104 can be operated as described above with reference to FIGS. 1A and 1B.

FIG. 6C shows an example of the thermal device 104-1 shown in FIG. 2B arranged between and around each cell 222 of the battery module 220 shown in FIG. 6A, which is shown as arrangement 220-1. The arrangement 220-1 is the same as the arrangement shown in FIG. 6B except that in FIG. 6C, the first and second terminals 156-1, 158-1 of the thermal device 104-1 are located on the same side of the battery module 220; the first terminal 156-1 of the thermal device 104-1 is connected to the positive terminal of the first cell 222-1 of the battery module 220 via the switch 114; and the second terminal 158-1 of the thermal device 104-1 is connected to the negative terminal of the fourth cell 222-4.

While not shown, another arrangement is also possible where the first and second terminals 156-1, 158-1 of the thermal device 104-1 are located on the same side of the battery module 220; the first terminal 156-1 of the thermal device 104-1 is directly connected to the positive terminal of the first cell 202-1 of the battery module 220; and the second terminal 158-1 of the thermal device 104-1 is connected to the negative terminal of the fourth cell 222-4 via the switch 114. The battery module 220 shown in the arrangement 220-2 can be used in the system 100 shown in FIG. 1A, and the thermal device 104-1 can be operated similar to the thermal device 104 described above with reference to FIGS. 1A and 1B.

FIGS. 7A and 7B show an example of a plurality of interconnected (cascaded) battery modules and a thermal device disposed around the cells of the cascaded battery modules. For example, in FIG. 7A, four battery modules 250-1, 250-2, 250-3, and 250-4 (collectively battery modules 250) are connected in series. Each battery module 250 is similar to the battery module 200 except that the battery module 250 includes three cells 252-1, 252-2, and 252-3 (collectively cells 252) connected in parallel instead of four cells 202 connected in series as shown in FIGS. 3A-5B. The cells 252 are similar to the cells 202.

Each battery module 250 includes a respective (i.e., separate) thermal device 104. In each battery module 250, a separate thermal device 104 is arranged between the cells 252 and around the battery module 250. An example of the thermal device 104 for the battery module 250 including three cells 252 is shown in FIG. 7B. The cascaded battery modules 250 can be used in the system 100 shown in FIG. 1A, and the thermal device 104 of each battery module 250 can be operated similar to the thermal device 104 described above with reference to FIGS. 1A and 1B.

In FIG. 7A, in each battery module 250, the positive terminals of the cells 252 are connected to each other, and the negative terminals of the cells 252 are connected to each other. In the first and third battery modules 250-1, 250-3, the positive terminals of the cells 252 are directly connected to the first terminal 156 of the respective thermal device 104, and the negative terminals of the cells 252 are connected to the second terminal 158 of the respective thermal device 104 via a respective switch 114. In the second and fourth battery modules 250-2, 250-4, the negative terminals of the cells 252 are directly connected to the second terminal 158 of the respective thermal device 104, and the positive terminals of the cells 252 are connected to the first terminal 156 of the respective thermal device 104 via a respective switch 114.

The positive terminals of the first battery module 250-1 are connected to the negative terminals of the second battery module 250-2. Consequently, the first terminal 156 of the thermal device 104 of the first battery module 250-1, the positive terminals of the cells 252 of the first battery module 250-1, the second terminal 158 of the thermal device 104 of the second battery module 250-2, and the negative terminals of the cells 252 of the second battery module 250-2 are connected to each other.

The positive terminals of the third battery module 250-3 are connected to the negative terminals of the fourth battery module 250-4. Consequently, the first terminal 156 of the thermal device 104 of the third battery module 250-3, the positive terminals of the cells 252 of the third battery module 250-3, the second terminal 158 of the thermal device 104 of the fourth battery module 250-4, and the negative terminals of the cells 252 of the fourth battery module 250-4 are connected to each other.

Additionally, the positive terminals of the second battery module 250-2 are connected to the negative terminals of the third battery module 250-3. While not shown, the thermal devices 104 need not be powered by the respective battery modules 250; instead, power from one of the battery modules 250 can be supplied to other thermal devices 104 of the other battery modules 250.

One or more switches 114 associated with the four battery modules 250 can be opened or closed. For example, one or more switches 114 can be closed at cold start and/or during start/stop operations (i.e., auto-start mode). Further, one or more switches 114 can be closed during charging mode, regeneration mode, power boost mode, test mode, dual/auxiliary battery mode, and other modes of operation of a electric/hybrid vehicle (or any other system/application).

The thermal devices 104, 104-1 are bidirectional; that is, their first and second terminals do not have specific polarities; rather, any terminal of the thermal devices 104, 104-1 can be connected to a positive or negative terminal of a cell or a battery module. Current flows through the thermal device 104, 104-1 from a terminal, which is connected to a positive terminal of a cell or a battery module, to a terminal, which is connected to a negative terminal of the cell or the battery module.

While not shown, arrangements similar to those shown and described with reference to FIGS. 6A-6C can be used with the cells 252 and the battery modules 250 shown in FIGS. 7A and 7B. In other words, the cells 252 can include positive and negative terminals on opposite sides of each cell 252 instead of on the same side of each cell 252. Further, while not shown, the thermal device 104-1 shown in FIG. 2B can be used with the cells 252 and the battery modules 250 shown in FIGS. 7A and 7B instead of the thermal device 104.

Additional permutations and combinations of the various features and configurations of the cells, battery modules, and thermal devices described with reference to FIGS. 3A-7B are feasible and contemplated. Further, the thermal device 104 may be used in various locations (e.g., between one or more cells of a battery module, around the battery module without being arranged between the cells of the battery module, etc.) as described below with reference to FIGS. 11A and 11B.

Figure 8D:
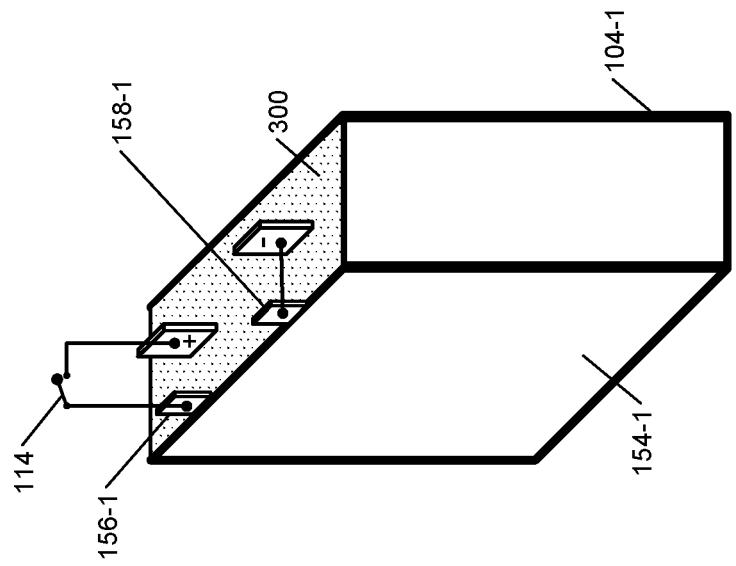

FIGS. 8A-8D show examples of a bipolar cell and a thermal device disposed around the bipolar cell. For example, FIG. 8A shows a 12V bipolar cell 300 having positive and negative terminals on the same side of the bipolar cell 300. The thermal device 104 shown in FIG. 8B surrounds the bipolar cell 300. In the perspective view shown, only the plastic layer 154-1 of the thermal device 104 is visible.

The first terminal 156 of the thermal device 104 is connected to the positive terminal of the bipolar cell 300. The second terminal 158 of the thermal device 104 is connected to the negative terminal of the bipolar cell 300 via the switch 114. Alternatively, while not shown, the first terminal 156 of the thermal device 104 can be connected to the positive terminal of the bipolar cell 300 via the switch 114, and the second terminal 158 of the thermal device 104 can be directly connected to the negative terminal of the bipolar cell 300.

The first and second terminals 156, 158 of the thermal device 104 are located on opposite sides of the bipolar cell 300. The bipolar cell 300 can be used in the system 100 shown in FIG. 1A, and the thermal device 104 can be operated similar to the thermal device 104 described above with reference to FIGS. 1A and 1B.

Figure 8C:
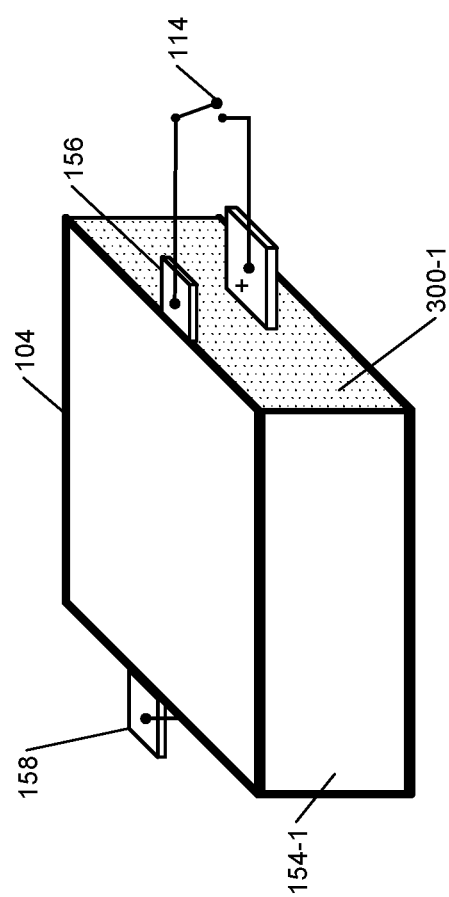

FIG. 8C shows an example of a bipolar cell 300-1 with positive and negative terminals on the opposite sides of the bipolar cell 300-1. The thermal device 104 shown in FIG. 8B surrounds the bipolar cell 300-1. In the perspective view shown, only the plastic layer 154-1 of the thermal device 104 is visible.

The first terminal 156 of the thermal device 104 is connected to a positive terminal of the bipolar cell 300-1 via the switch 114. The second terminal 158 of the thermal device 104 is directly connected to a negative terminal (not visible) of the bipolar cell 300-1. Alternatively, while not shown, the first terminal 156 of the thermal device 104 can be directly connected to the positive terminal of the bipolar cell 300-1, and the second terminal 158 of the thermal device 104 can be connected to the negative terminal (not visible) of the bipolar cell 300-1 via the switch 114.

The first and second terminals 156, 158 of the thermal device 104 are located on opposite sides of the bipolar cell 300-1. The bipolar cell 300-1 can be used in the system 100 shown in FIG. 1A, and the thermal device 104 can be operated similar to the thermal device 104 described above with reference to FIGS. 1A and 1B.

FIG. 8D shows an example of the bipolar cell 300 with the thermal device 104-1 shown in FIG. 2B surrounding the bipolar cell 300. In the perspective view shown, only the plastic layer 154-1 of the thermal device 104-1 is visible. The first terminal 156-1 of the thermal device 104-1 is connected to the positive terminal of the bipolar cell 300 via the switch 114. The second terminal 158-1 of the thermal device 104-1 is directly connected to the negative terminal of the bipolar cell 300. Alternatively, while not shown, the first terminal 156-1 of the thermal device 104-1 can be directly connected to the positive terminal of the bipolar cell 300, and the second terminal 158-1 of the thermal device 104-1 can be connected to the negative terminal of the bipolar cell 300 via the switch 114.

The first and second terminals 156-1, 158-1 of the thermal device 104-1 are located on the same side of the bipolar cell 300. The bipolar cell 300 can be used in the system 100 shown in FIG. 1A, and the thermal device 104-1 can be operated similar to the thermal device 104 described above with reference to FIGS. 1A and 1B.

Figure 9C:
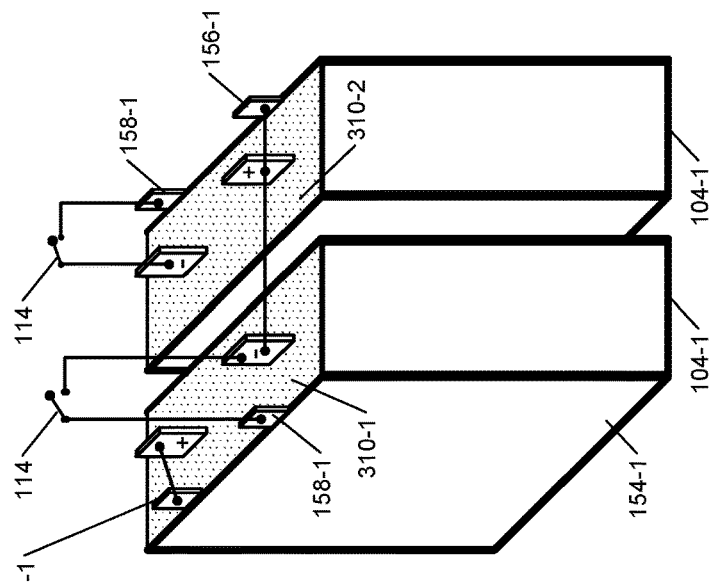
FIGS. 9A, 9B, and 9C show examples of bipolar cells and the thermal devices of FIGS. 2A and 2B disposed around the bipolar cells according to the present disclosure.
Figure 9A:
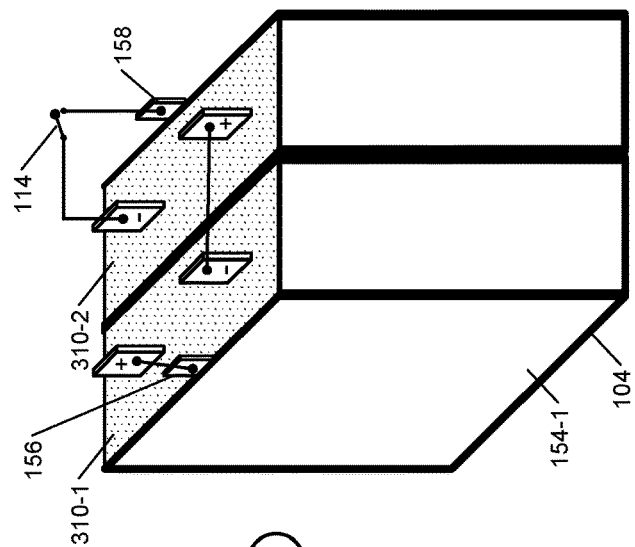
Figure 9B:
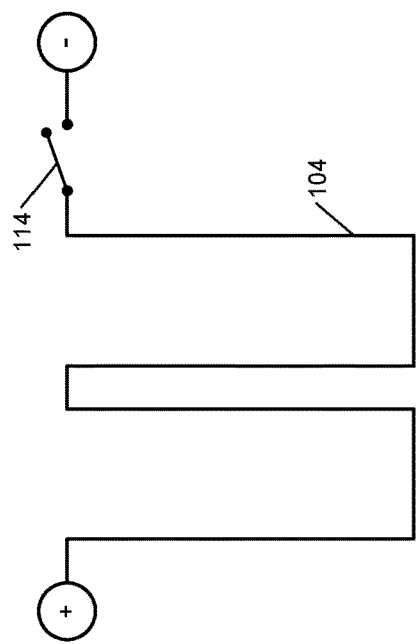

FIGS. 9A-9C show examples of other arrangements of multiple bipolar cells and the thermal devices 104, 104-1. For example, FIG. 9A shows two bipolar cells 310-1, 310-2 connected in series. The bipolar cells 310-1, 310-2 are identical to the bipolar cell 300 shown in FIG. 8A. A negative terminal of the first bipolar cell 310-1 is connected to a positive terminal of the second bipolar cell 310-2. FIG. 9B shows an example of the thermal device 104 that can be used with the two bipolar cells 310-1, 310-2.

In FIG. 9A, the thermal device 104 is arranged between and around the two bipolar cells 310-1, 310-2. In the perspective view shown, only the plastic layer 154-1 of the thermal device 104 is visible. The first terminal 156 of the thermal device 104 is connected to a positive terminal of the first bipolar cell 310-1. A negative terminal of the second bipolar cell 310-2 is connected to the second terminal 158 of the thermal device 104 via the switch 114. Alternatively, while not shown, the first terminal 156 of the thermal device 104 can be connected to the positive terminal of the first bipolar cell 310-1 via the switch 114, and the negative terminal of the second bipolar cell 310-2 can be directly connected to the second terminal 158 of the thermal device 104.

The first and second terminals 156, 158 of the thermal device 104 are located on opposite sides of the two bipolar cells 310-1, 310-2. The bipolar cells 310-1, 310-2 can be used in the system 100 shown in FIG. 1A, and the thermal device 104 can be operated similar to the thermal device 104 described above with reference to FIGS. 1A and 1B.

FIG. 9C shows the two bipolar cells 310-1, 310-2 connected in series as shown in FIG. 9A. Each of the first and second bipolar cells 310-1, 310-2 is enclosed in (i.e., covered or surrounded by) a respective (i.e., separate) thermal device 104-1. A first terminal 156-1 of the first thermal device 104-1 covering the first bipolar cell 310-1 is connected to the positive terminal of the first bipolar cell 310-1. A second terminal 158-1 of the first thermal device 104-1 covering the first bipolar cell 310-1 is connected to the negative terminal of the first bipolar cell 310-1 via a first switch 114. Alternatively, while not shown, the first terminal 156-1 of the first thermal device 104-1 can be connected to the positive terminal of the first bipolar cell 310-1 via the first switch 114, and the second terminal 158-1 of the first thermal device 104-1 can be directly connected to the negative terminal of the first bipolar cell 310-1.

Additionally, a first terminal 156-1 of the second thermal device 104-1 covering the second bipolar cell 310-2 is connected to the positive terminal of the second bipolar cell 310-2. A second terminal 158-1 of the second thermal device 104-1 covering the second bipolar cell 310-2 is connected to the negative terminal of the second bipolar cell 310-2 via a second switch 114. Alternatively, while not shown, the first terminal 156-1 of the second thermal device 104-1 can be connected to the positive terminal of the second bipolar cell 310-2 via the second switch 114, and the second terminal 158-1 of the second thermal device 104-1 can be directly connected to the negative terminal of the second bipolar cell 310-2.

Figure 10A:
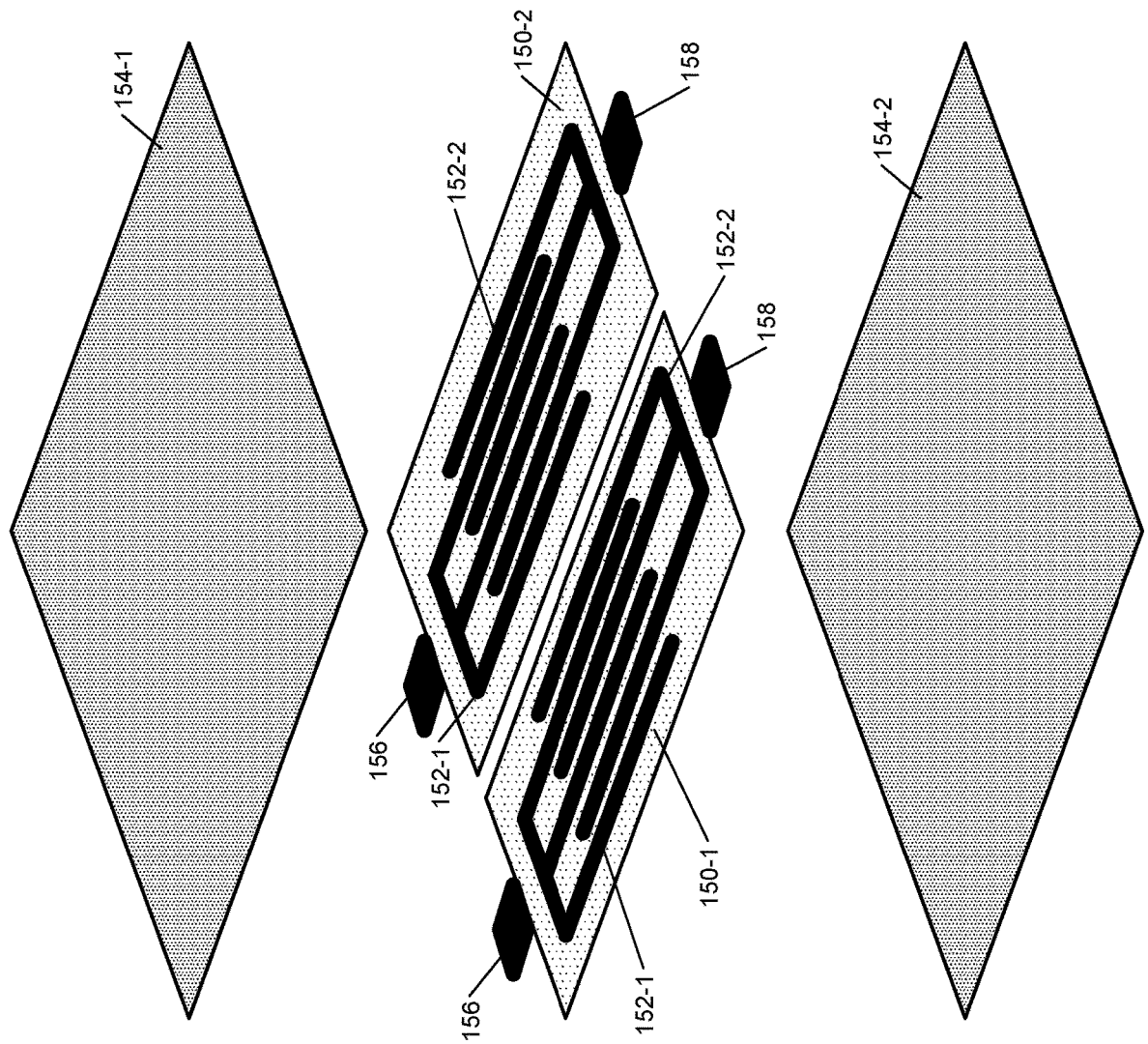
FIG. 10A shows an example of a dual thermal device according to the present disclosure.
Figure 10B:
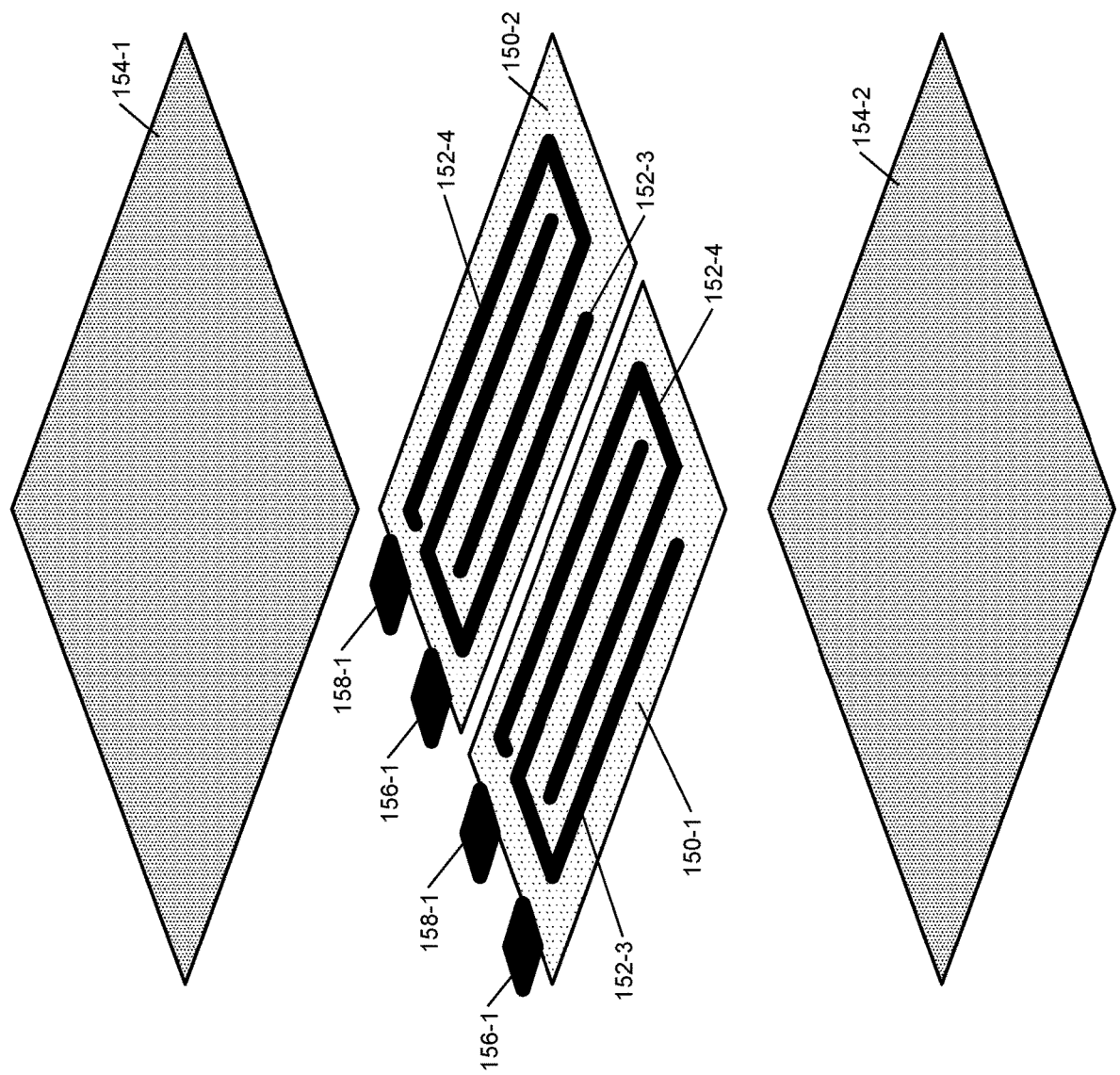
FIG. 10B shows another example of a dual thermal device according to the present disclosure.

FIGS. 10A and 10B show examples of a dual thermal device. FIG. 10A shows an example of a dual thermal device 350-1. The dual thermal device 350-1 is similar to the thermal device 104 shown in FIG. 2A except that the dual thermal device 350-1 includes two first layers 150 (shown as 150-1, 150-2 and called the first layer 150-1 and the second layer 150-2, respectively), two sets of the metal wires 152-1, 152-2, and two sets of the first and second terminals 156, 158 arranged between the plastic layers 154.

A first set of the first and second terminals 156, 158 is connected to the first layer 150-1, and a second set of the first and second terminals 156, 158 is connected to the second layer 150-2. The first layer 150-1, a first set of the metal wires 152-1, 152-2 arranged on the first layer 150-1, and a first set of the first and second terminals 156, 158 connected to the first layer 150-1 form a first thermal device of the dual thermal device 350-1. The second layer 150-2, a second set of the metal wires 152-1, 152-2 arranged on the second layer 150-2, and a second set of the first and second terminals 156, 158 connected to the second layer 150-2 form a second thermal device of the dual thermal device 350-1.

FIG. 10B shows an example of a dual thermal device 350-2. The dual thermal device 350-2 is similar to the thermal device 104-1 shown in FIG. 2B except that the dual thermal device 350-2 includes two first layers 150 (shown as 150-1, 150-2 and called the first layer 150-1 and the second layer 150-2, respectively), two sets of the metal wires 152-3, 152-4, and two sets of the first and second terminals 156-1, 158-1 arranged between the plastic layers 154.

A first set of the first and second terminals 156-1, 158-1 is connected to the first layer 150-1, and a second set of the first and second terminals 156-1, 158-1 is connected to the second layer 150-2. The first layer 150-1, a first set of the metal wires 152-3, 152-4 arranged on the first layer 150-1, and a first set of the first and second terminals 156-1, 158-1 connected to the first layer 150-1 form a first thermal device of the dual thermal device 350-2. The second layer 150-2, a second set of the metal wires 152-3, 152-4 arranged on the first layer 150-2, and a second set of the first and second terminals 156-1, 158-1 connected to the second layer 150-2 form a second thermal device of the dual thermal device 350-2.

The dual thermal device 350-1 can be used instead of the thermal device 104 in FIGS. 3A-9C. The dual thermal device 350-2 can be used instead of the thermal device 104-1 in FIGS. 3A-9C. When used, one or both of the first and second thermal devices in the dual thermal devices 350-1, 350-1 can be turned on to heat one or more portions of the cells and battery modules. The first and second thermal devices in the dual thermal devices 350-1, 350-1 can be turned on and off at varying duty cycles (e.g., by the system 100 shown in FIG. 1A, using PWM for example).

In some implementations, the first layer 150-1 and the second layer 150-2 can include different nonmetallic materials that are good conductors of heat and electricity. Further, the first layer 150-1 and the second layer 150-2 can have different thicknesses. Furthermore, the metal wires disposed on the first layer 150-1 can include different material and/or can have different thicknesses and different layout (i.e., pattern) than the metal wires disposed on the second layer 150-2.

Figure 11B:
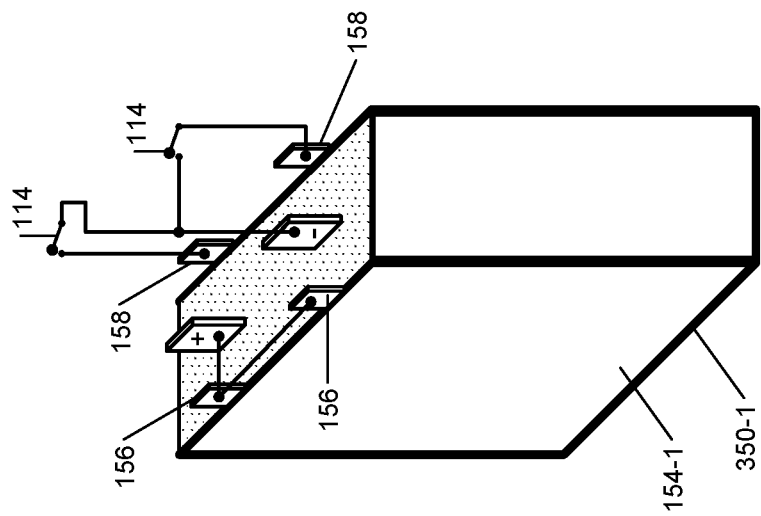
FIG. 11B shows an example of a bipolar cell with the dual thermal device of FIG. 10A disposed around the bipolar cell according to the present disclosure.
Figure 11A:
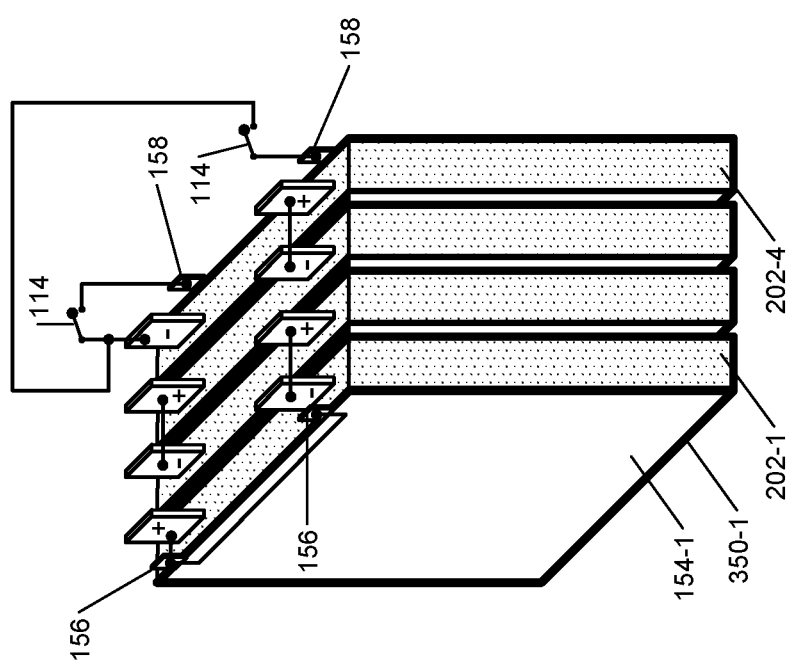
FIG. 11A show an example of a battery module with the dual thermal device of FIG. 10A disposed around the cells of the battery module according to the present disclosure.

FIGS. 11A and 11B show examples of battery modules and the dual thermal device disposed around cells of the battery modules. FIG. 11A shows the dual thermal device 350-1 used with the battery module 200 shown in FIG. 3A. The first terminals 156 of the first and second thermal devices in the dual thermal device 350-1 are connected to the positive terminal of the first cell 202-1 of the battery module 200. The second terminals 158 of the first and second thermal devices in the dual thermal device 350-1 are connected to the negative terminal of the fourth cell 202-1 of the battery module 200 via respective switches 114. Alternatively, while not shown, the first terminals 156 of the first and second thermal devices in the dual thermal device 350-1 can be connected to the positive terminal of the first cell 202-1 via respective switches 114, and the second terminals 158 of the first and second thermal devices in the dual thermal device 350-1 can be directly connected to the negative terminal of the fourth cell 202-1.

One or both of the first and second thermal devices in the dual thermal device 350-1 can be turned on to heat one or more portions of the cells 202 of battery module 200. The battery module 200 and the dual thermal device 350-1 can be used in the system 100 shown in FIG. 1A, and each of the first and second thermal devices in the dual thermal device 350-1 can be operated similar to the thermal device 104 described above with reference to FIGS. 1A and 1B.

FIG. 11B shows the dual thermal device 350-1 used with the bipolar cell 300 shown in FIG. 8A. The first terminals 156 of the first and second thermal devices in the dual thermal device 350-1 are connected to the positive terminal of the bipolar cell 300. The second terminals 158 of the first and second thermal devices in the dual thermal device 350-1 are connected to the negative terminal of the bipolar cell 300 via the switch 114. Alternatively, while not shown, the first terminals 156 of the first and second thermal devices in the dual thermal device 350-1 can be connected to the positive terminal of the bipolar cell 300 via the switch 114, and the second terminals 158 of the first and second thermal devices in the dual thermal device 350-1 can be directly connected to the negative terminal of the bipolar cell 300.

One or both of the first and second thermal devices in the dual thermal device 350-1 can be turned on to heat one or more portions of the bipolar cell 300. The bipolar cell 300 and the dual thermal device 350-1 can be used in the system 100 shown in FIG. 1A, and each of the first and second thermal devices in the dual thermal device 350-1 can be operated similar to the thermal device 104 described above with reference to FIGS. 1A and 1B.

In some implementations, in any of the arrangements of battery modules and cells shown and described throughout the present disclosure, the thermal devices 104, 104-1, 350-1, 350-2 can cover the entire surface area of the cells or the battery modules as shown in FIG. 3A onwards. For example, the thermal devices 104, 104-1, 350-1, 350-2 may cover a portion of the surface area of the cells or the battery modules. For example, the thermal devices 104, 104-1, 350-1, 350-2 may cover only a center portion of the cells or the battery modules, or a portion proximate to one of the edges of the cells or the battery modules. For example, the first and second thermal devices in the dual thermal devices 350-1, 350-2 may cover portions proximate to the edges of the cells or the battery modules.

In some implementations, the thermal devices 104, 104-1, 350-1, 350-2 may be arranged between alternate cells of a battery module, between alternate battery modules (in cascaded battery modules), between each cell in all except first and last battery modules and around the first and last battery modules (in cascaded battery modules), and so on. Any combination of the various arrangements of the thermal devices 104, 104-1, 350-1, 350-2 described throughout the present disclosure may be used.

Throughout the present disclosure, the battery modules shown and described herein can include, without limitation, cells of the following types: liquid based lithium ion batteries, hybrid cells (liquid plus polymer, liquid plus ceramic particles), or any other types of cells. The cell format can be, without limitation, pouch, prismatic, or cylindrical. Further, the voltage range that can be achieved using the battery modules shown and described herein can be 12V to 150V.

The battery modules and the cells described throughout the present disclosure can include other arrangements of positive and negative terminals. For example, the cells and the battery modules can include multiple positive and negative terminals. These multiple terminals can be located at multiple locations on the cells and the battery modules. The thermal devices described throughout the present disclosure can be operated with these other arrangements.

Further, throughout the present disclosure, the thermal devices are shown and described as being powered by the respective cells or battery modules that the thermal devices heat. However, other sources of power can be used to supply power to the thermal devices instead. For example, in an electric vehicle, a high voltage battery can be used to power the thermal devices (e.g., via a DC-to-DC converter). Alternatively, power from a charger that charges the battery modules can be used to power the thermal devices (e.g., via a DC-to-DC converter). In other examples, a power supply connected to a wall outlet (AC mains) can be used to supply power to the thermal devices. Power from these sources can be supplied to the thermal devices using a remote control such as a key fob. While the vehicle is being driven, power from a generator in the vehicle can be used to power the thermal devices. Many other alternate or additional sources of power to supply the power to the thermal devices are contemplated.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a battery to supply power to a vehicle;
a thermal device disposed within the battery to heat the battery, the thermal device comprising:
a first layer of a non-metallic material that is a good conductor of heat and electricity, that includes a first terminal and a second terminal, and that has a first surface and a second surface;

a metallic material disposed on the first surface of the first layer;
a first plastic layer disposed on the metallic material; and
a second plastic layer disposed on the second surface of the first layer,
wherein the first plastic layer and the second plastic layer include a plastic material that is a good conductor of heat; and
wherein the non-metallic material includes a phase change material.

2. The system of claim 1 wherein the metallic material, the first terminal, and the second terminal include copper, aluminum, nickel, nickel coating with copper, stainless steel, or an aluminum alloy.

3. The system of claim 1 wherein the plastic material includes polyphenylene sulfide, polybutylene terephthalate, liquid-crystal polymer, polycarbonate, or polyamide.

4. The system of claim 1 wherein the plastic material of the first plastic layer is different than the plastic material of the second plastic layer.

5. The system of claim 1 wherein thicknesses of the first plastic layer and the second plastic layer are different.

6. The system of claim 1 wherein:
the battery comprises N cells, where N is an integer greater than 1;
wherein the thermal device is disposed around at least one of the N cells within the battery;
the first terminal is connected to one of a positive terminal and a negative terminal of the battery; and
the second terminal is connected to the other one of the positive terminal and the negative terminal of the battery via a switch.

7. The system of claim 6 wherein the first layer of the thermal device conducts heat from the at least one of the N cells.

8. The system of claim 6 further comprising a startup circuit configured to:
receive a signal to connect the battery to a load; and
close the switch in response to receiving the signal.

9. The system of claim 8 wherein:
current flows through the first layer and heats the first layer and the metallic material; and
the metallic material generates infrared radiation that heats the at least one of the N cells.

10. The system of claim 8 further comprising:
a temperature sensor configured to sense a temperature of the at least one of the N cells,
wherein the startup circuit is configured to close the switch in response to the temperature being less than a threshold temperature and open the switch in response to the temperature being greater than or equal to the threshold temperature.

11. A battery system comprising:
M of the thermal device of claim 1, where M is an integer greater than 1; and
M batteries connected to each other, each of the M batteries comprising N cells, where N is an integer greater than 1;
wherein the M thermal devices are disposed around at least one of the N cells of the M batteries within the M batteries, respectively; around the M batteries, respectively, without being disposed around the N cells of the M batteries; or both;
the first terminal of the M thermal devices is connected to one of a positive terminal and a negative terminal of the M batteries, respectively; and
the second terminal of the M thermal devices is connected to the other one of the positive terminal and the negative terminal of the M batteries, respectively, via a respective switch.

12. The battery system of claim 11 wherein the first layer of the M thermal devices conducts heat from the at least one of the N cells of the M batteries, respectively; or from the M batteries, respectively.

13. The battery system of claim 11 further comprising a startup circuit configured to:
receive a signal to connect a load to the M batteries; and
close the switch for at least one of the M thermal devices in response to receiving the signal.

14. The battery system of claim 13 wherein:
current flows through the first layer and heats the first layer and the metallic material of the at least one of the M thermal devices; and
the metallic material of at least one of the M thermal devices generates infrared radiation that heats the at least one of the N cells of the M batteries or at least one of the M batteries, respectively.

15. The battery system of claim 13 further comprising:
a temperature sensor configured to sense a temperature of the at least one of the N cells of at least one of the M batteries,
wherein the startup circuit is configured to close the switch for at least one of the M thermal devices in response to the temperature being less than a threshold temperature and open the switch for at least one of the M thermal devices in response to the temperature being greater than or equal to the threshold temperature.

16. The system of claim 1 further comprising:
a second layer of a non-metallic material that is a good conductor of heat and electricity, that includes a third terminal and a fourth terminal, and that has a third surface and a fourth surface;
a second metallic material disposed on the third surface of the second layer;
the first plastic layer disposed on the second metallic material; and
the second plastic layer disposed on the fourth surface of the second layer.

17. The system of claim 16 wherein at least one of:
thicknesses of the first layer and the second layer are different; and
thicknesses of the metallic material and the second metallic material are different.

18. The system of claim 16 wherein:
the battery comprises N cells, where N is an integer greater than 1;
wherein the thermal device is disposed around at least one of the N cells within the battery;
the first terminal and the third terminal are connected to one of a positive terminal and a negative terminal of the battery; and
the second terminal and the fourth terminal are connected to the other one of the positive terminal and the negative terminal of the battery via a first switch and a second switch, respectively.

19. The system of claim 18 wherein the first layer and the second layer conduct heat from the at least one of the N cells, the system further comprising:
a startup circuit configured to receive a signal to connect the battery to a load and to close at least one of the first switch and the second switch in response to receiving the signal, wherein current flows through at least one of the first layer and the second layer and heats at least one of the first layer and the second layer and at least one of the metallic material and the second metallic material; and wherein at least one of the metallic material and the second metallic material generates infrared radiation that heats the at least one of the N cells.

20. The system of claim 1 further comprising a charging system that charges the battery and that supplies power to the thermal device.

21. The system of claim 20 wherein the charging system comprises a generator in the vehicle that generates power during motion of the vehicle.

\* \* \* \* \*